(12) United States Patent
Umapathy et al.

(10) Patent No.: US 10,025,573 B2
(45) Date of Patent: Jul. 17, 2018

(54) EXTENSIBLE DISTRIBUTION/UPDATE ARCHITECTURE

(75) Inventors: Thangaraj Umapathy, Karnataka (IN); Richard Teo, London (GB); Sudharshan Somasundaram, Karnataka (IN); Kapil Raja Durga, Karnataka (IN); Akshava G, Karnataka (IN); Raghuram C G, Karnataka (IN); Shyam Rajagopalan, Karnataka (IN); Mihir Gore, Bangalore (IN); Mandeep Singh, Karnataka (IN); Hemantha Sharma, Karnataka (IN); Priyesh Kumar, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 1358 days.

(21) Appl. No.: 12/420,615

(22) Filed: Apr. 8, 2009

(65) Prior Publication Data
US 2014/0033198 A1    Jan. 30, 2014

(51) Int. Cl.
*G06F 9/445* (2018.01)
*G06F 8/61* (2018.01)
*G06F 17/30* (2006.01)

(52) U.S. Cl.
CPC ........... *G06F 8/61* (2013.01); *G06F 17/30* (2013.01); *G06F 9/445* (2013.01)

(58) Field of Classification Search
CPC ................ G06F 9/445; G06F 17/30
USPC .................................................. 717/174
See application file for complete search history.

(56) References Cited

U.S. PATENT DOCUMENTS

| 6,941,453 | B2 | 9/2005 | Rao |
| 7,305,484 | B2 | 12/2007 | Munetsugu et al. |
| 2002/0147735 | A1* | 10/2002 | Nir .......................... G06F 9/445 |
| 2004/0158712 | A1* | 8/2004 | Lee et al. ...................... 713/165 |
| 2004/0215754 | A1* | 10/2004 | Orleth ................... G06F 9/4411 709/223 |
| 2007/0192818 | A1 | 8/2007 | Bourges-Sevenier et al. |
| 2007/0300217 | A1* | 12/2007 | Tunmer ................... G06F 8/38 717/177 |
| 2008/0133569 | A1 | 6/2008 | Vu et al. |

(Continued)

OTHER PUBLICATIONS

Antonio Savoldi and Paolo Gubian. "Symbian Forensics: An Overview." Intelligent Information Hiding and Multimedia Signal Processing, 2008. IIHMSP'08 International Conference on. IEEE, 2008. pp. 529-533.*

*Primary Examiner* — Wei Zhen
*Assistant Examiner* — Mohammed Huda
(74) *Attorney, Agent, or Firm* — Shook, Hardy & Bacon L.L.P.

(57) ABSTRACT

Methods and systems to install a player to process content data are disclosed. In some embodiments, a method includes launching a content access manager on a user device to read metadata containing compatible player data, determine whether a compatible player able to access the content data is installed on the user device, and if not, to install a compatible player. Other embodiments involve receiving content data and data about one or more compatible players able to access the content data, generating the metadata using the data about one or more compatible players, and distributing the content data, the metadata, and the content access manager in a transmittable unit. Additional apparatus, systems, and methods are disclosed.

38 Claims, 13 Drawing Sheets

(56) References Cited

U.S. PATENT DOCUMENTS

2009/0150553 A1* 6/2009 Collart et al. ................ 709/229
2009/0186575 A1* 7/2009 Cedo Perpinya et al. ... 455/41.2
2010/0070533 A1* 3/2010 Skinner et al. ............... 707/791
2010/0094900 A1* 4/2010 Hughes, Jr. ................... 707/770

* cited by examiner

EXTENSIBLE DISTRIBUTION/UPDATE ARCHITECTURE

BACKGROUND

In many fields of endeavour, content is distributed or downloaded. Often, a particular application or player is needed to access, play, or process the content, and in some cases, only certain versions of these applications or players are able to access, play, or process the content correctly.

BRIEF DESCRIPTION OF DRAWINGS

Some embodiments are illustrated by way of example, and not limitation, in the figures of the accompanying drawings.

DETAILED DESCRIPTION

Figure 1:
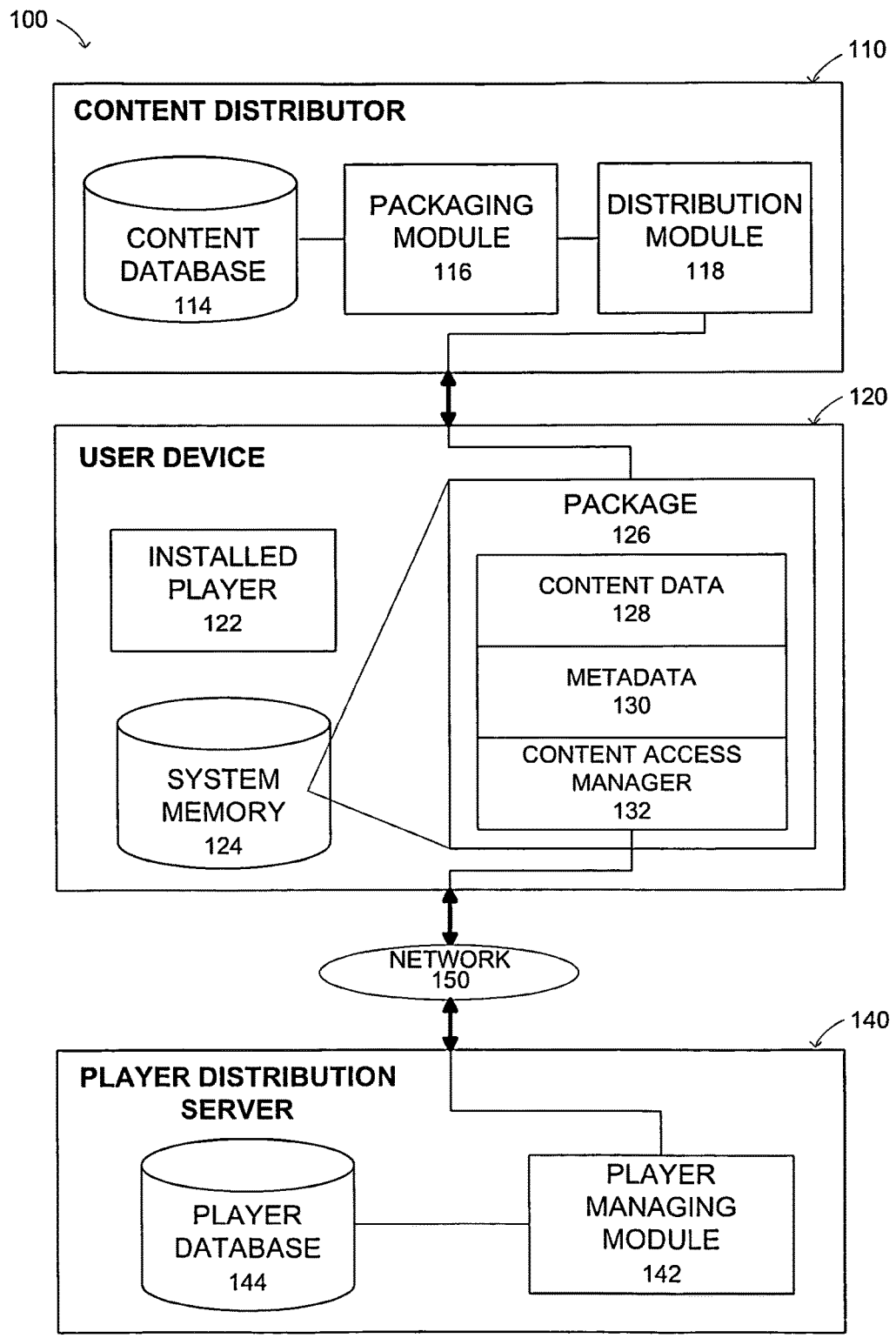
FIG. 1 is a block diagram that illustrates a system for providing a compatible player to process content data, according to various embodiments.

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

For the purposes of this specification, the terms "content" or "content data" may include media content, applications (such as games, mobile device applications, etc.), or any other digital content that can be accessed by a player or other software to run. The content may comprise one or more files. There are countless content types and versions available today that all need specific applications to be accessed properly. Example content data may include, but are not limited to, Microsoft® Word documents, Microsoft Excel® spreadsheets, PowerPoint® presentations, Portable Document Format ("PDF") documents, Joint Photographic Experts Group ("JPEG") files, Audio Video Interleave ("AVI") files, Waveform audio format ("WAV") files, Shockwave® Flash (".SWF") files, Flash® Video ("FLV") files, Extensible Markup Language ("XML") files, configuration ("CFG") files, MPEG-1 Audio Layer 3 ("MP3") files, or combinations of files. One subset of content is applications that require a player to run. For example, some applications require an Adobe Flash® Player or Adobe Flash Lite™ to run on a computer or mobile device.

A "player" may include any application or software that can be used to access, present, or play content to a user. Because content can also comprise an application, the term "player" will be used to avoid confusion. Thus, to illustrate, applications such as Adobe Flash® Player and Adobe Flash Lite™ are examples of players according to various embodiments that may be used to access, present, or play content in the form of SWF files.

In most cases only certain players are able to process certain content. These players are thus compatible with the content that they are able to process. A compatible player is one that is able to correctly access, present, or play the content provided. In an example where content data is of "Type X," File A may only be correctly accessed by an "X-Player" version 2.0 or later and File B may only be correctly accessed by X-Player 1.0 or later. Thus, for File A, X-Player version 2.0 or higher are compatible players, while X-Players that are versions less than 2.0, although able to access other content data of Type X, are not compatible players. More specifically, X-Player version 1.5 would not be a compatible player for File A, however, it would be compatible for File B.

Generally, merely having possession of the content alone is not enough to properly process it. A user may desire to use an installed player to access the content for processing, such as by playing the content. Sometimes a user's machine may have a player that is able to process the content already installed on it. At other times, there is no installed player that is able to process the content, or the installed player is of the correct type but the wrong version (and unable to process the content), or there is a newer version of the player that can process the content (which has not yet been installed). In those cases, a user should act to find the appropriate player and install it. Difficulties may arise when the user does not know whether he or she already has the appropriate player installed, which player to install, which version of the player to download, or where to locate the correct player.

Content distributors may attempt to aid users by directing users to the correct player application. However, in so doing, the content distributors may find it useful to take into consideration the content characteristics and each user's specific details such as device capabilities, whether the appropriate player is already installed, other system software such as the operating system, and other compatibility issues. When there are several versions of a content player, content developers may also take into consideration which versions of a player users have and develop content that will be compatible with those versions of the player.

In an example embodiment, a content access manager will be packaged with the content data. The content access manager will determine which player and version is able to process the content data, check to determine whether the user already has this version of the player installed, and operate to install a compatible player capable of processing the content data if the user does not have it already installed. In some embodiments, if the user has an appropriate player but the player is not the latest version, the content access manager may ask the user if he wants to install the latest version. As a result, an updated version of the player able to play the content data will be provided to the user.

In another embodiment, the content access manager will collect user machine or device information and use it to determine which player and version is able to process the content. This may include transmitting information about the content data to a remote location accessible via a network, transmitting device information to the remote location, and retrieving a compatible player from a remote location accessible via a network. A remote location, for the purposes of this document is any location not on the same machine. For example, a remote location may include a server, an aggregator website, a file-sharing network (peer-to-peer or otherwise), or some other Uniform Resource Locator (URL).

FIG. 1 is a block diagram that illustrates a system 100 for providing a compatible player to process content data, according to various embodiments. The system may include a content distributor 110 that is coupled to a user device 120 through a network 150. The system may also include a player distribution server 140 coupled to the user device 120 through a network 150. The network 150 may be of any type. For example, the network 150 may include a LAN or WAN, a wired or wireless network, cellular networks, or other mobile network. While FIG. 1 employs a client-server architecture, embodiments are not limited to such an architecture. For example, some embodiments may be incorporated into a distributed or peer-to-peer architecture system.

The content distributor 110 may comprise one or more machines and may contain a content database 114, a packaging module 116, and a distribution module 118. The content distributor 110 may also contain a content developer module (not shown). In one embodiment, a content developer module aids in the creation of content data 128 to be processed. This content data 128 may either be stored in the content database 114 or directly transmitted to the packaging module 116.

Figure 2A:
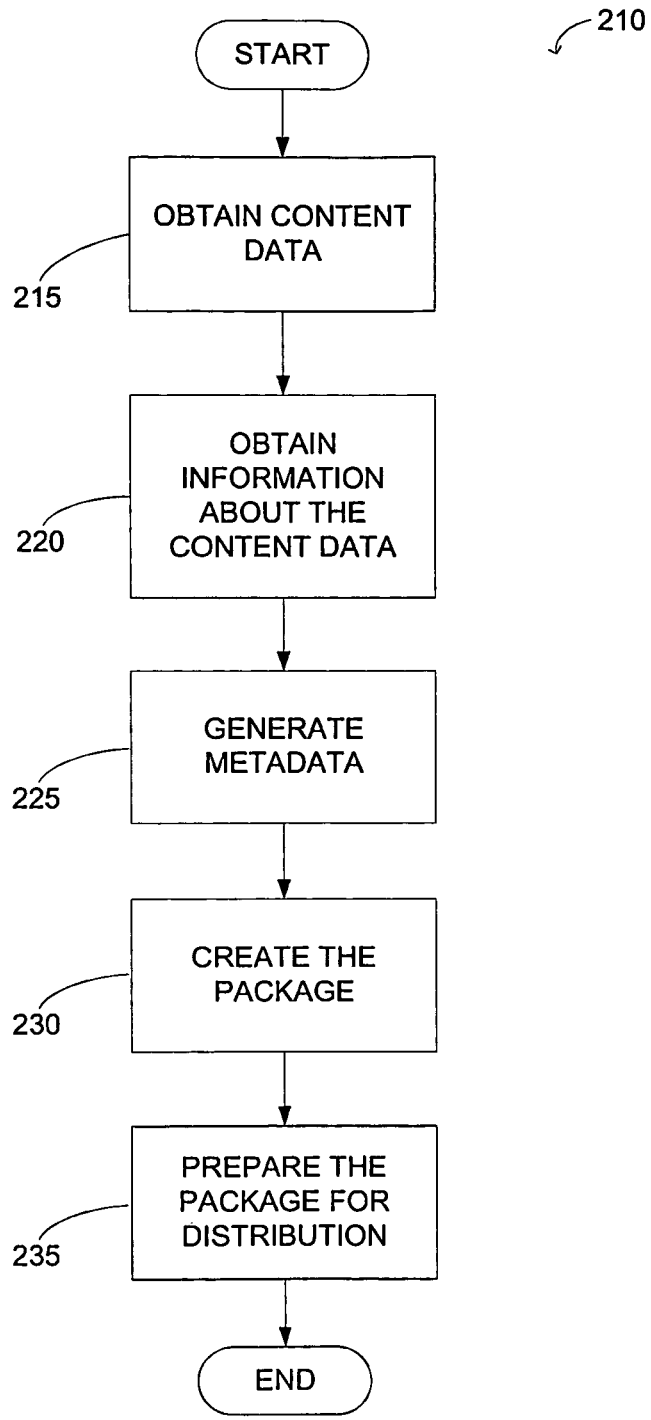
FIG. 2A is a flow diagram illustrating a method to create a package according to various embodiments.

FIG. 2A is a flow diagram illustrating a method 210 to create a package according to various embodiments. At operation 215, the packaging module 116 (FIG. 1) may obtain content data from the content database 114 (FIG. 1), the content developer module, or another outside source. At operation 220, the packaging module 116 may obtain information about the content data. For example, the packaging module may obtain the information from the user through a user interface module, the content developer module, or one or more files associated with the content data.

At operation 225, the packaging module 116 may then generate the metadata 130 containing information about one or more compatible players able to correctly process, access, or present the content data 128 (FIG. 1) and include it in the package 126 (FIG. 1). The metadata 130 (FIG. 1) may be included as one or more distinct segments, be included in the content data 128, such as in the file headers, or exist as a combination of the two. Although metadata 130 contains compatible player information, it is not limited to such information. For example, metadata 130 information may include one or more of the following: the name or other identifier of the content, version data of the content, an icon to be used with the content, the size of the content, author data, a description of the content, the compatible player type, the compatible player version, and the target platform.

The package 126 may be created by the packaging module 116 at operation 230. Here, the content data 128 will be combined with a content access manager 132 (FIG. 1) to form a package 126. In other embodiments, the generated metadata 130 will also be included in the package 126.

The content access manager 132 included in the package 126 may be a generic content access manager such that it may be packaged with any content data regardless of the type of content data, or the requirements of the content data. As will be described in more detail below, the generic content access manager may determine whether a compatible player that is installed on a user device 120 (FIG. 1) and install a compatible player on a user device 120 for any content.

The package 126 may take many forms such as a SIS installable file for the Symbian operating system, a CAB installable file, a ZIP file, or a self-extracting program. In one embodiment, after the package 126 is created, the distribution module 118 (FIG. 1) may operate to prepare the package 126 for distribution. For example, the distribution module 118 may put the package 126 onto a CD, DVD, Blu Ray disc, USB drive, flash memory, or any other distributable machine-readable medium for distribution. In another embodiment, the distribution module 118 may transmit the package 126 to a receiver. The receiver may include a user machine or device, an aggregator that collects multiple packages and distributes the packages to other machines, or any other distribution network using any available means (e.g., through the interne, a cellular network, the mail).

After the package is created, the distribution module 118 will receive the package and prepare it for distribution at operation 235. For example, the package may be put onto a CD, DVD, or any other distributable machine-readable medium, or the package may be published onto a website, such as an aggregator website or network of websites that collect such packages and provide access to them.

Figure 2B:
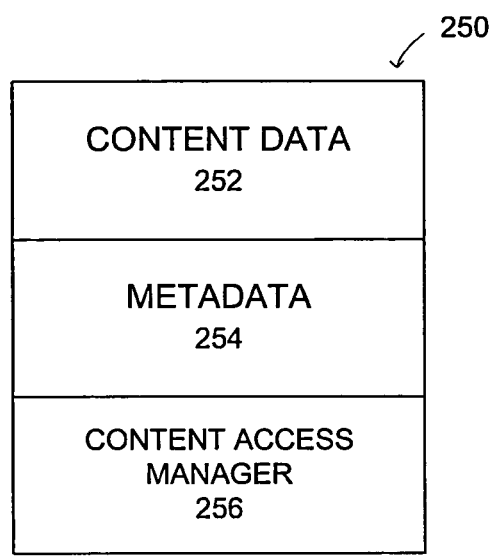
FIG. 2B is a diagram of a package according to one embodiment.

FIG. 2B is a diagram of a package 250 according to some embodiments. The package 250 may include content data 252 that is to be processed, metadata 254, and a content access manager 256. The metadata 254 includes information about one or more players that are able to correctly process the content data 252. This information may include player type, player version, and player requirements. Metadata 254 may also include information about the content data 252. For example, metadata 254 may include the name of the content, content details, author information, a description or preview of the content, or custom icons to be used with the content. In one embodiment, the metadata 254 may take the form of one or more configuration files or may be included in the content data 252. For example, metadata 254 may be included in one or more of content files or be included in one or more content file headers.

Referring back to FIG. 1, the user device 120 may be in the form of a computer, a handheld device such as a PDA, a mobile phone, or any other machine that is designed to be able to process digital content. The user device 120 may contain, among other things, an installed player 122 stored on a system memory 124. The user device 120 contains an Input/Output (I/O) interface or communications interface configured to receive a package 126. For example, the I/O interface or communications interface may be CD-ROM drive, DVD or Blu Ray drive, USB port, flash memory reader, or network interface through which the device may communicate with other computers or devices. When a package 126 is received, the contents may be stored in the system memory 124. According to one embodiment, the content of the package 126 may further be installed on the user device 120. In another embodiment where the package is received via a distributable machine-readable medium, the package may be accessed directly from the distributable machine-readable medium.

The content access manager 132 at the user device 120 may be configured to read the metadata 130 containing compatible player data, and use this information to determine the player type and player version of one or more compatible players. The content access manager 132 may also check the user device 120 to determine if a player is already installed. If there is an installed player 122, the content access manager 132 checks to determine whether the installed player 122 is of a compatible player type and player version. If a compatible player is already installed, the content may then be processed using this player. If, on the other hand, there is no compatible player installed, the content access manager 132 may contact a player distribution server 140 to obtain a compatible player.

A player distribution server 140 may also consist of one or more machines and may contain a player managing module 142 and a player database 144. The player database 144 may store various players (e.g., applications) of various versions, including the latest version. The player database 144 may also store a record of various players including information about the players and where the players may be obtained. The content access manager 132 at a user device 120 may contact the player distribution server 140 and transmit information about the content data including all or a portion of the information contained in the metadata 130 over a network 150. In some embodiments, the content access manager 132 may also send user device information to the player distribution server 140 over the network 150. The player managing module 142 will use this received data to determine which players in the player database 144 are compatible with the content data 128 and send the compatible player to the user device 120. When one or more compatible players are found, the player managing module 142 may provide the user device with a compatible player or the location of a compatible player. Once the compatible player is received by the user device 120 the content access manager 132 can install the compatible player. The process of determining whether installing a compatible player is necessary and the installation of a compatible player are discussed in more detail below.

Figure 3:
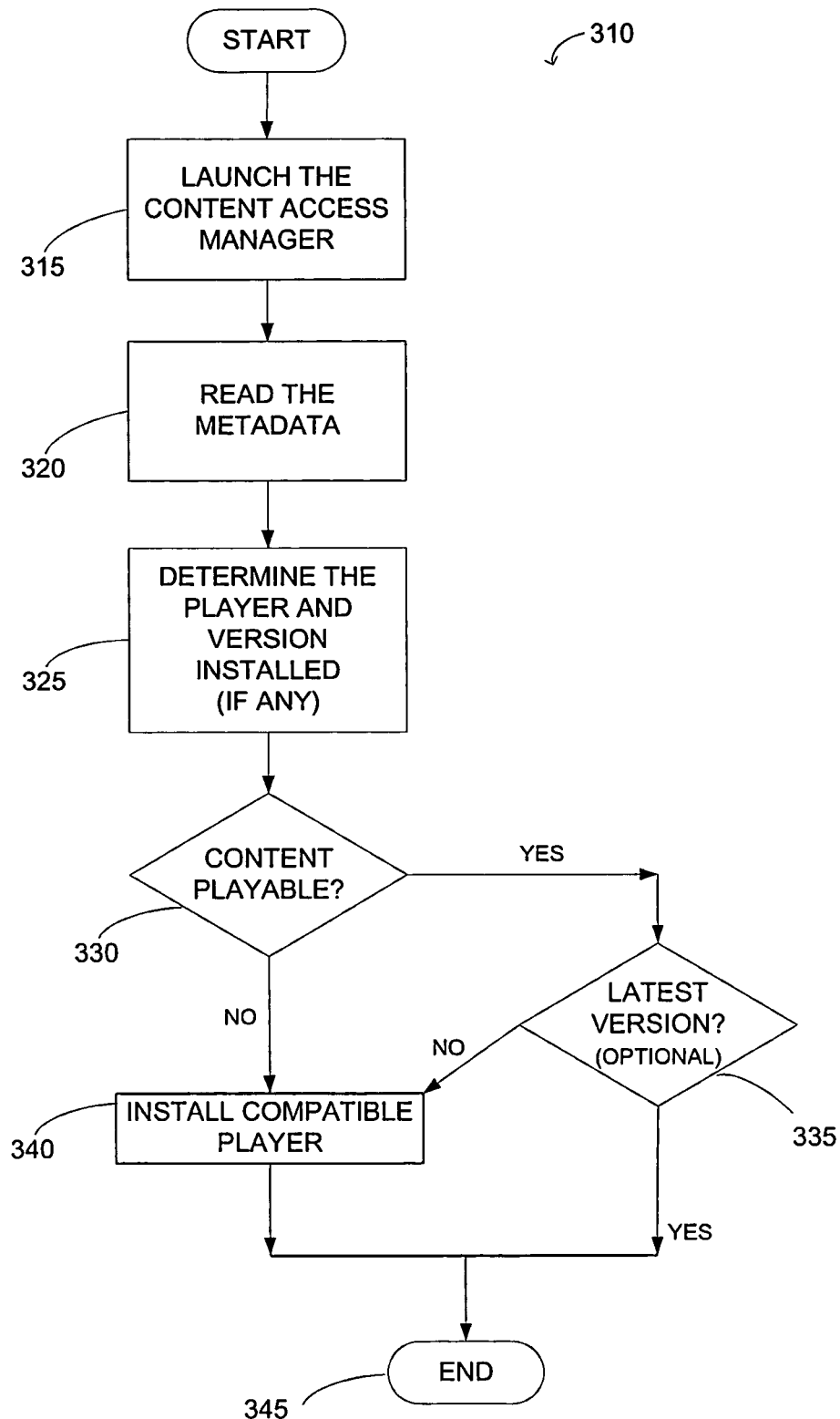
FIG. 3 is a flow diagram illustrating a method to provide process to content data according to various embodiments.

FIG. 3 is a flow diagram illustrating a method 310 to provide access to content data according to various embodiments. The method 310 initially begins after a user device has received a package such as the package 250 referenced in FIG. 2B. More specifically, the content access manager can be launched on a user device at operation 315. In one embodiment, the content access manager is launched when the package is unpackaged or installed onto a user device such as a desktop computer or mobile device. In other embodiments, the content access manager may be launched when a user attempts to process the content or when a user launches the content access manager directly.

At operation 320, the content access manager reads metadata associated with the content data. In embodiments, the metadata is received in a package along with the content access manager and content data. The metadata may be used to help identify one or more players compatible with the content data. For example, the content access manager may use the metadata to determine which of one or more player types and player versions are compatible with the content data.

At operation 325, the content access manager determines the player type and version of players already installed on the user device. In some instances, there is no player installed. In that case, the content cannot be played and a compatible player may be installed. In one example embodiment, the content access manager creates and maintains a device configuration table to keep track of installed players. The device configuration table may contain entries of installed players and their versions. Once the device configuration table is created, a content access manager may determine the player type and version already installed on the user device by looking up the device configuration table. The information contained in the device configuration table need not be limited to table form. For example, installed player and version information may be recorded and maintained in a configuration file.

If an installed player is found, the content access module determines whether the installed player is compatible with the content data at operation 330. In one embodiment, this is done by using the information gathered in operations 320 and 325 and determining if a compatible player of the same type is installed on the user device. If there is no installed player of a compatible player type, a compatible player should be installed. If there is an installed player of a compatible player type, the version of the installed player is compared to the version of the corresponding compatible player type. If a version higher than or equal to the version of the corresponding compatible player type that is installed, then the content can be played, otherwise, the player should be upgraded (e.g., a higher version should be installed).

In some embodiments, once it is determined that the content can be played by the installed player, the content access manager is done at operation 345 and no further operations are performed. However, in another embodiment, even if the installed player is compatible with the content data, the content access module will determine if the installed player version is the latest available version for the player. This occurs at operation 335. If the player installed on the user device is the latest available version for the player, no further action is desired and the content access manager is done at operation 345. If the player installed on the user device is not the latest version for the player, the content access manager may either prompt the user to see if the user wishes to upgrade to the latest version of the installed player, or automatically proceed to operation 340 to install the latest version of the player.

If there is no player of a compatible type installed or if a version of an installed player is less than the minimum version required to play the content data, a compatible player is installed on the user device at operation 340. In one embodiment, the user is first prompted to install the compatible player. One example embodiment of the installation operation such as operation 340 in FIG. 3 will be discussed further in relation to FIG. 4. After the compatible player is installed, the content access manager is done at operation 345. In one example embodiment, the content data may be launched (e.g., accessed and played by the compatible player) by the content access manager either before or after the content access module is done at operation 345.

Figure 4:
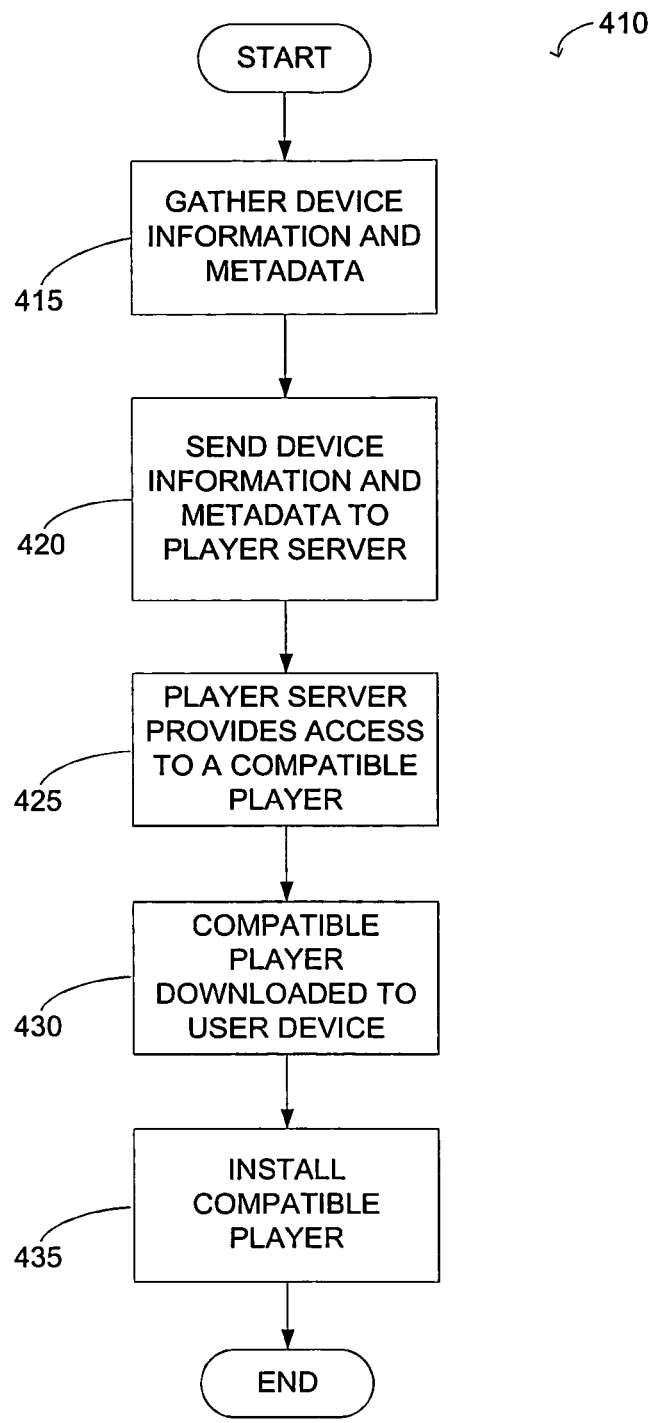
FIG. 4 is a flow diagram illustrating a method, according to various embodiments, to install a compatible player.

FIG. 4 is a flow diagram illustrating a method 410 according to various embodiments, to install a compatible player. Information may be gathered to correctly identify and install a compatible player able to process the content data. For example, at operation 415, the content access module may gather device information and all or portions of metadata information about the content data.

At operation 420, the content access module may send the gathered device information along with metadata to a player server. The player server may determine, using the sent information, a compatible player and, at operation 425, provide the user device with access to a compatible player. For example, the player server may provide the user device with a URL link or attempt to transfer the compatible player directly through using a file transfer protocol. The player server may provide the user device with access to the latest version of a compatible player, the minimum required version to provide correct access, all compatible players, or provide a choice of compatible players.

In some embodiments, the player server will also provide compatible player details such as the player version, the player ID, player name, licensing information, etc. The content access module may check that the player version being provided by the player server is equal to or greater than the player version of a compatible player of the same type.

At operation 430, the user device downloads the compatible player provided by the player server and at operation 435, and the compatible player is installed. If there is a device configuration file or table, as discussed above, the content access module may update the entries to reflect the completed installation.

FIGS. 5-10 illustrate various embodiments involving the distribution of players to enable content to be accessed on a computer or mobile device such as a mobile phone. The computer or mobile device may be running on a particular operating system on which some players may run on and other players may not be able to run on. For example, a mobile device may run on the Windows Mobile operating system or the Symbian operating system. In some embodiments, the Windows® CAB Software Development Kit ("SDK") and the Symbian™ Software Development Kit ("SDK") are to be installed on the machine creating the package. The packaging module may create a cabinet ("CAB") file package for mobile devices running on the Windows Mobile platform or a Symbian Installation Source ("SIS") file package for mobile devices running on the Symbian platform.

Figure 5:
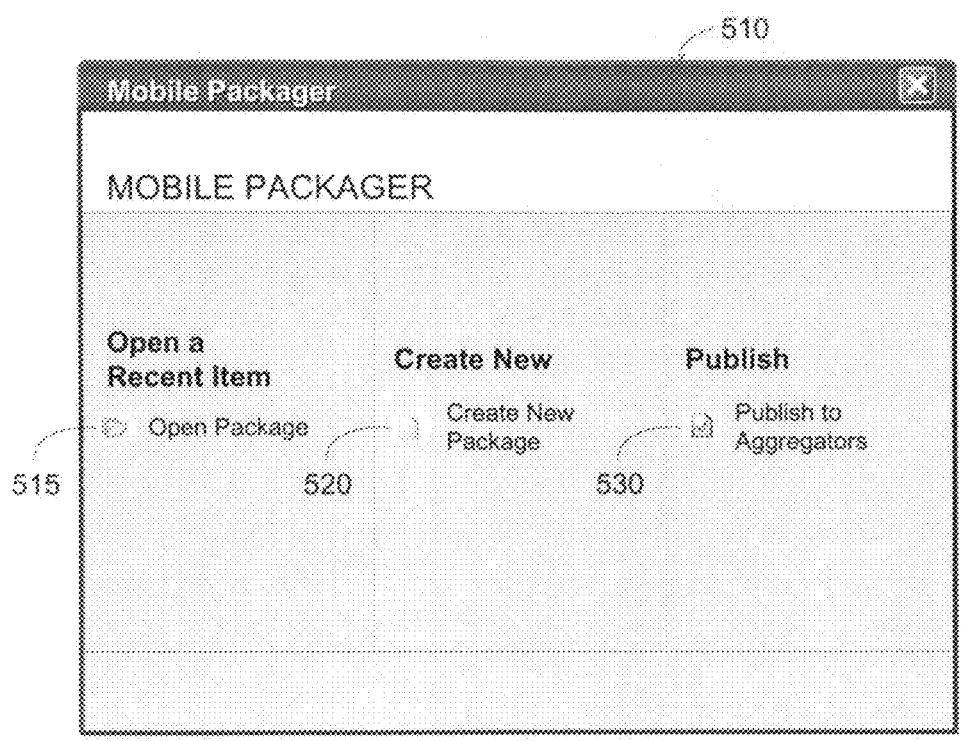
FIG. 5 is a user interface illustrating a welcome screen, according to various embodiments.

The packaging module may provide a user interface to allow a user to create a package containing content data. For example, FIG. 5 is a user interface illustrating a welcome screen 510 that displays a list of functions available to a user. For example, the "Open Package" function 515 opens a user interface with recently created packages as well as an option that allows a user to search for a previously created package. The "Create New Package" function 520 opens a main window, allowing a user to create a package. The "Publish to Aggregators" function 530 opens a user interface that allows a package to be provided to aggregators, the aggregators in turn will distribute the packages to the user devices.

Figure 6:
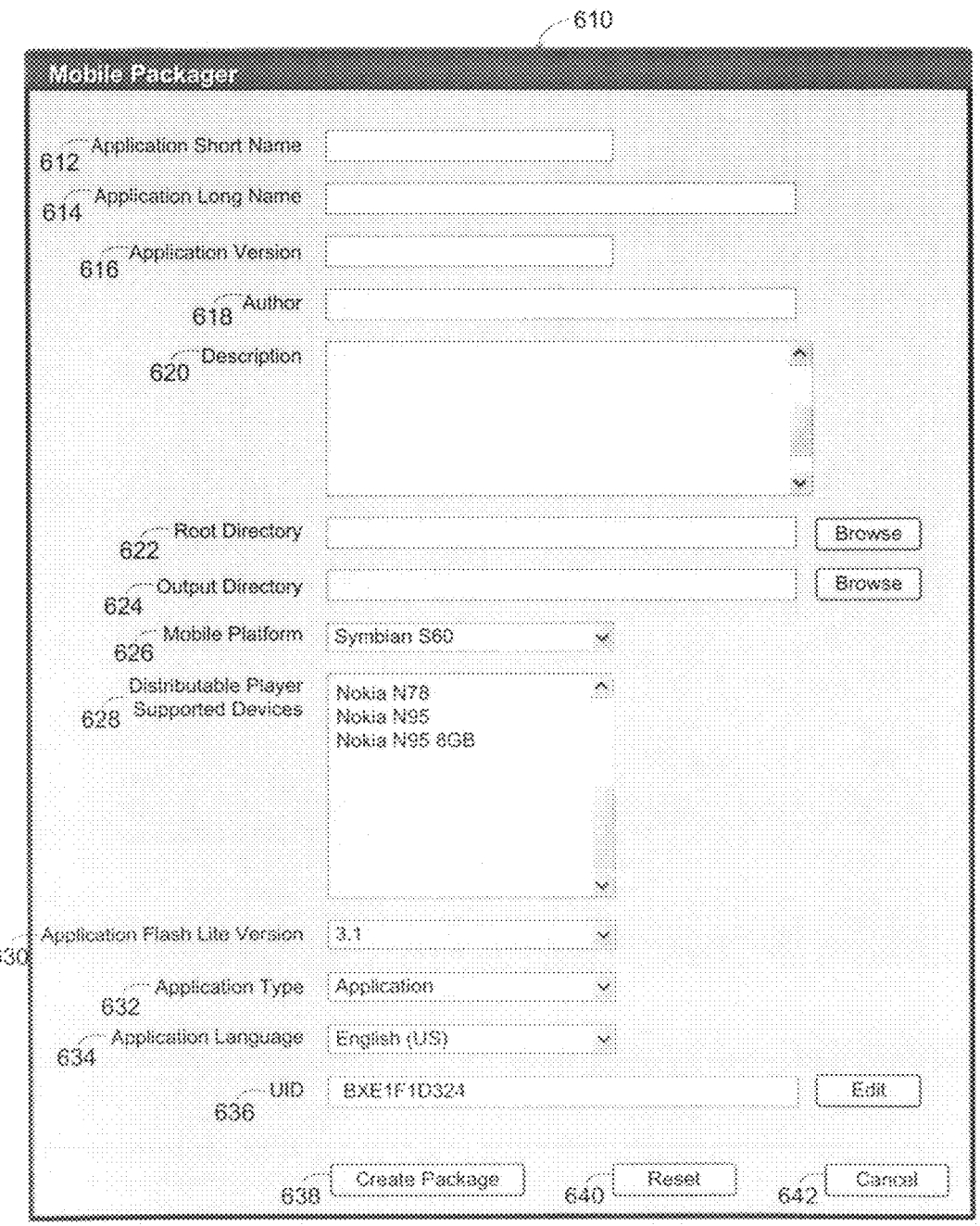
FIG. 6 is a user interface illustrating the main window that allows a user to specify the relevant information about the package being created, according to various embodiments.

FIG. 6 is an example user interface illustrating the main window 610 that allows a user to specify the relevant information about the package being created. In FIG. 6, the content data being packaged is a Flash application; however, content data of any type can be put into a package. The "Application Short Name" field 612 identifies the name of the application content data. The "Application Long Name" field 614 may be used to specify a more descriptive name identifying the content data. The "Application Version" field 616 specifies the version of the packaged application. The "Author" field 618 specifies the name of the publisher of the content. The "Description" field 620 specifies a description of the application. The "Root Folder" field 622 identifies the folder where one or more of the application content data files are located. The Browse button next to the field enables a user to search for the folder in a file directory. In addition to content data, the root folder may contain an icon to be associated with the content data. If there is no icon included in the root folder, the packaging module may later include a default icon in the package. The "Output Folder" field 624 identifies the folder where the package is to be created.

The main window 610 may also allow a user to specify what requirements the content data have and which devices they are intended to run on. For example, the "Mobile Platform" field 626 allows a user to select a target Mobile Platform for the content. The drop-down field may list all supported platforms available to a user. In the example illustrated in FIG. 6, the user has specified Symbian S60 as the target platform. The "Distributable Player Supported Devices" field 628 lists the specific mobile devices supported by the mobile platform selected. The "Application Flash Lite Version" field 630 allows a user to specify the version of Flash Lite to be used with the content data. The content access manager may later use this information to determine whether a user's mobile device has a compatible player for the content. The "Application Type" field 632 specifies the content type of the content data. The "Application Language" field 634 specifies the language of the messages displayed by the player. Some mobile platforms make use of a user ID (UID) to run an application on the platform. The "UID" field 636 supplies the required UID. This field may be generated automatically, inputted by the user, or obtained from another source. The "Reset" button 640 resets one or more of the fields shown in FIG. 6 to their default values and the "Cancel" button 642 exits the main window 610. The "Create Package" button 638 may be used when the user is ready to create the package.

Figure 7A:
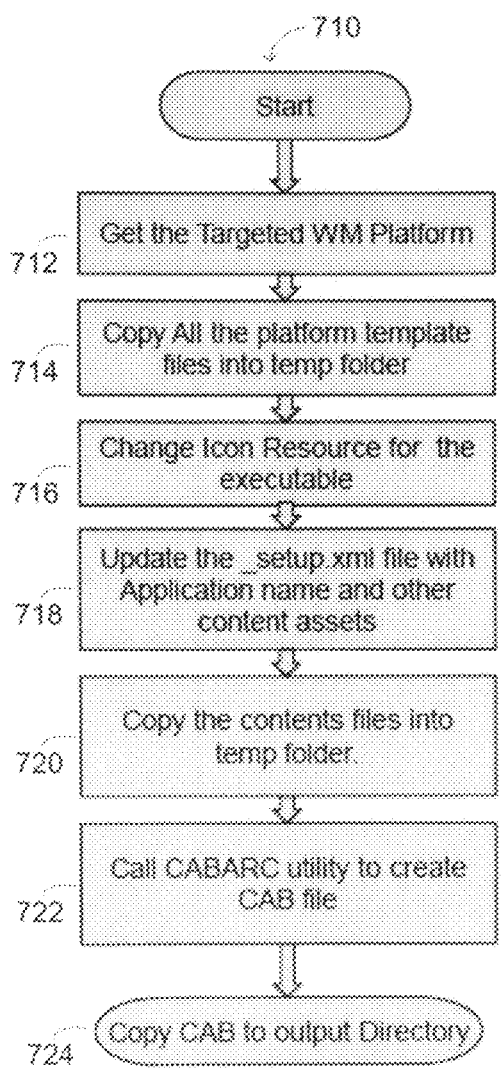
FIG. 7A is a flow diagram illustrating a method to create a package for the Windows Mobile Platform, according to various embodiments.

In one embodiment, activating the button 638 to create a package causes the packaging module to perform the method illustrated in FIG. 7A, which is a flow diagram illustrating a method 710 to create a package (i.e., a CAB file) for the Windows Mobile® Platform. At operation 712, the packaging module obtains targeted Windows Mobile® Platform information. At operation 714, platform template files are copied into a temporary folder. At operation 716, if an icon is found in the root folder, it is associated with the content data. At operation 718, a setup file is updated with the application name and other content information and all the content files are copied to the temporary folder at operation 720. A utility, such as the CABARC utility, creates the CAB file in operation 722 and the completed CAB file is outputted to the output directory at operation 724.

Figure 7B:
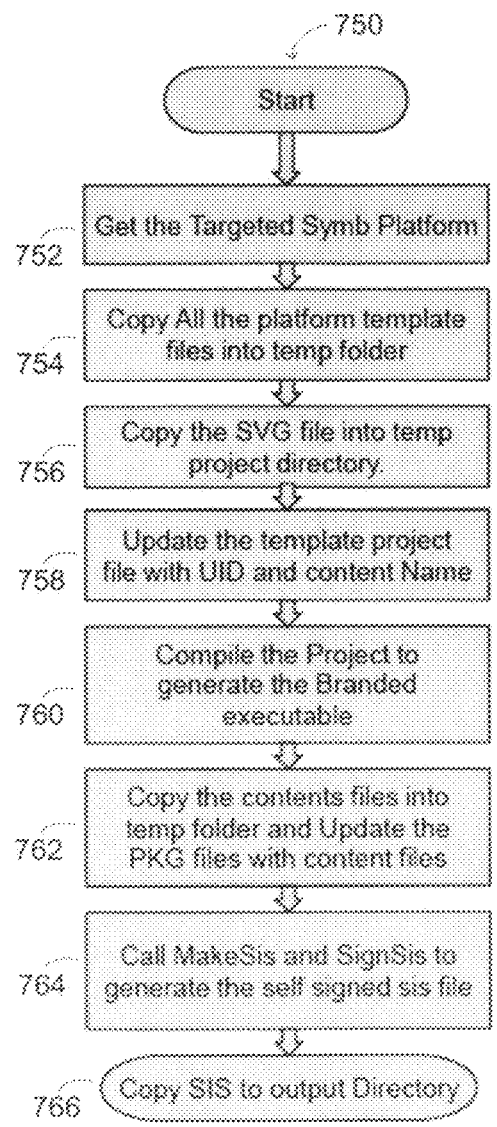
FIG. 7B is a flow diagram illustrating a method to create a package for the Symbian Mobile Platform, according to various embodiments.

In another embodiment, activating the button 638 to create a package causes the packaging module to perform the method illustrated in FIG. 7B. FIG. 7B is a flow diagram illustrating a method 750 to create a package (e.g., a SIS file) for the Symbian™ Mobile Platform. At operation 752, the packaging module obtains targeted Symbian™ Mobile Platform information. All the platform template files are copied into a temporary folder at operation 754 and the icon (i.e., the SVG file), if any, is also copied into a temporary project directory at operation 756. The template project files are updated with the UID and content name at operation 758 and the project is compiled to generate an executable file at operation 760. Next, the content files are copied into the temporary folder and the package files are updated with the content files at operation 762. Finally, a MakeSis function and a SignSis function are called to generate the self signed SIS file at operation 764 and the SIS file is outputted to the output directory at operation 766.

Figure 8:
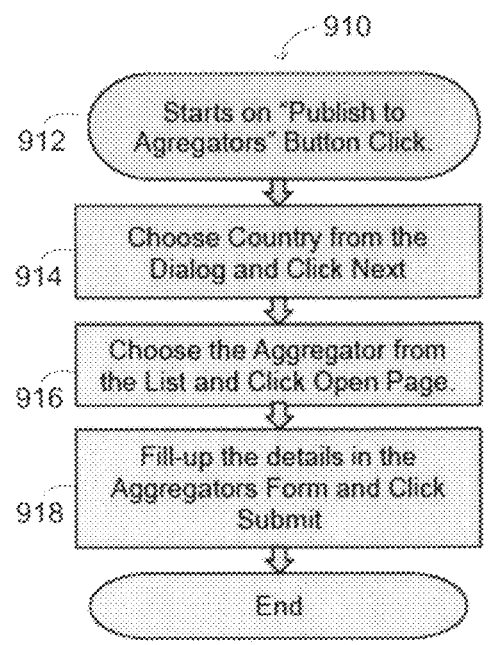
FIG. 8 is a flow diagram illustrating a method to submit a package to an aggregator for publishing, according to various embodiments.
Figure 9:
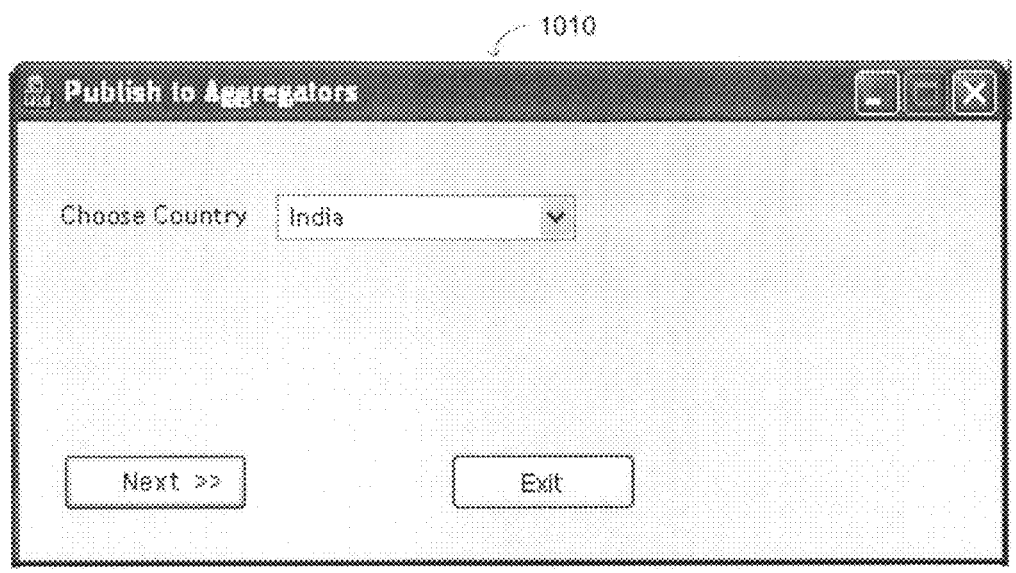
FIG. 9 is a user interface illustrating a window that allows a user to specify a country in which to publish the content data, according to various embodiments.
Figure 10:
FIG. 10 is a user interface illustrating a window that allows a user to specify an aggregator to distribute a package, according to various embodiments.

As indicated by the welcome screen 510 in FIG. 5, a user may also publish a package to an aggregator. FIG. 8 is a flow diagram illustrating a method 910 to submit a package to an aggregator for publishing. The method begins when a selection of the "Publish to Aggregators" function is received at operation 912. For example, if a selection to activate the "Publish to Aggregators" function 530 is received from the welcome screen 510, a window, such as the "Publish to Aggregators" window 1010 in FIG. 9, may appear to allow a user to specify the country in which to publish the content data. Selection of one or more desired countries occurs at operation 914. Once the country is selected, an additional window, such as the window 1050 in FIG. 10, may appear and display the available aggregators for that country. Selection of a desired aggregator occurs at operation 916, which may take a user to another window or website where the user can fill out an aggregators form and submit the package to the aggregator to distribute at operation 918.

Figure 11:
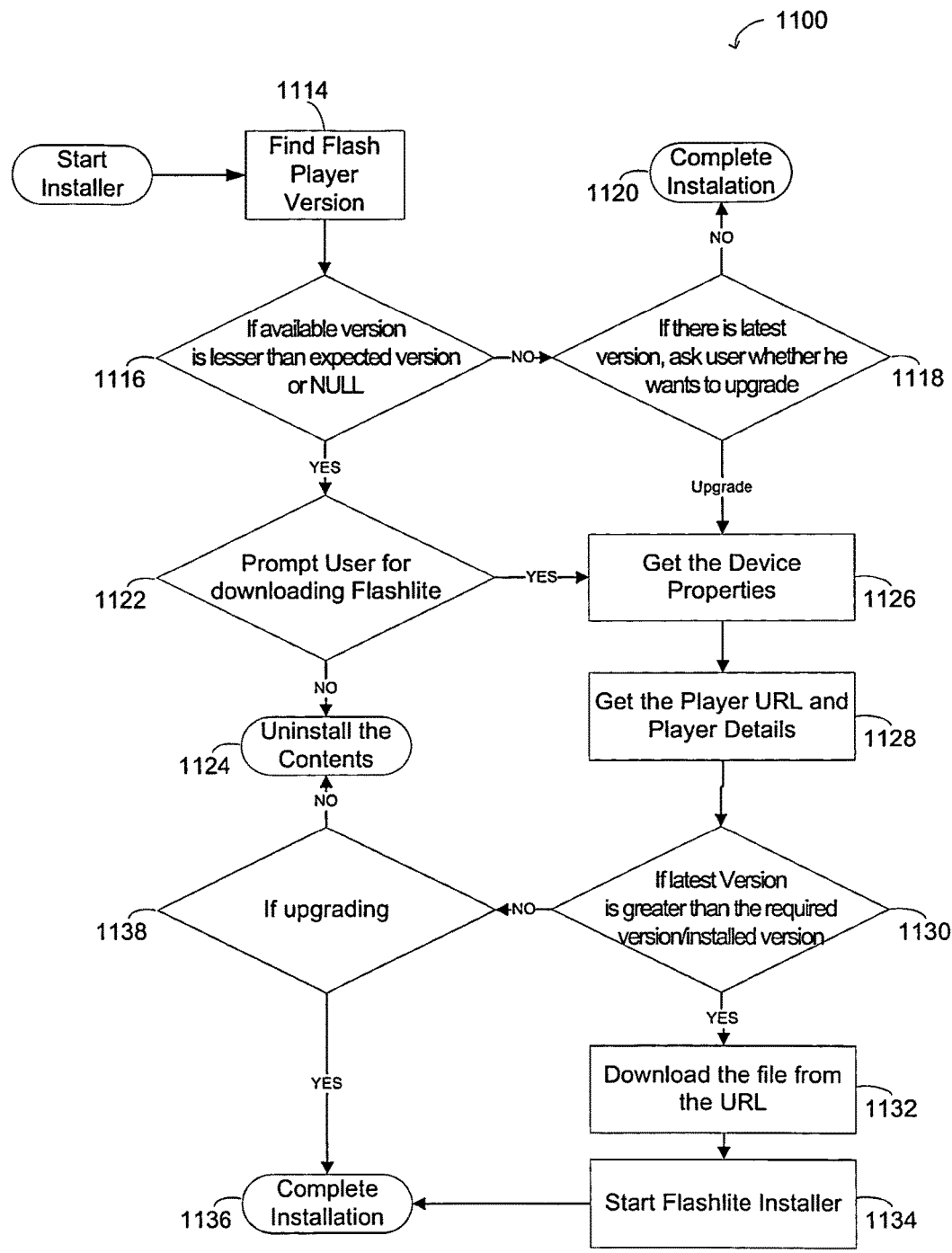
FIG. 11 is a flow diagram illustrating a method to provide process to Flash content data by distributing Flash Lite Players according to various embodiments.

FIG. 11 is a flow diagram illustrating a method 1100 to provide access to Flash content data by distributing Flash Lite Players according to various embodiments, though it should be understood that this is provided only for illustration purposes and this could apply to other content and media players other than the Flash context. The method 1100 may begin when the content access manager has been launched on a user device. The method 110 may start by determining the Flash Player version of the Flash Player installed on the user machine at operation 1114. At operation 1116, it can be determined if the version available on the user machine is less than a version required to play the content or if the version is a NULL value because of an error or because there is no Flash Player installed on the user machine. If the installed Flash Player version is not NULL and not less than expected, the content can be accessed with the existing Flash Player on the user machine. However, the content access manager may further determine whether the latest version is installed on the user machine at operation 1118. If it is not the latest version, the content access manager may attempt to determine if an indication has been received to upgrade to the latest version. If the installed player is the latest player or if no indication is received that the user wants to upgrade to the latest version, no further action is taken and the installation can be considered complete at operation 1120. If an indication is received that the user wants to upgrade to the latest version, the method will proceed to operation 1126, which is discussed below.

If the installed player version is NULL or less than expected/desired, a query may be made to download a compatible version of the Flash Lite Player at operation 1122. If the user does not want to download a compatible version of the Flash Lite Player, the contents of the package may be uninstalled at operation 1124. If the user wants to download a compatible version of the Flash Lite Player, the content access manager will gather the device properties of the user machine at operation 1126. Next, at operation 1128, the content access manager will get the location and player details of the Flash Lite Player to be downloaded. In one embodiment, this is done by sending the device properties and content compatibility information to a player server. The player server may then operate to determine an appropriate Flash Lite Player and send the content access manager the player details and URL where the player may be downloaded.

At operation 1130, the content access manager checks to determine that the version of the player to be downloaded is greater than or equal to the version required to access the content or greater than the version of the player installed on the user machine. If it is not, the player to be downloaded will be unable to access the content. The content access manager will determine whether the player currently installed on the user device is adequate to play the content and the user is merely requesting an upgrade to the latest version available at operation 1138. If the user was not attempting to upgrade the player installed on the user machine, the contents of the package will be uninstalled at operation 1124. If the user was attempting to upgrade the player, the upgrade will be cancelled and the installation process is completed at operation 1136.

At operation 1130, if the version of the player to be downloaded is greater than the version required to access the content or greater than the version of the player installed on the user machine, the content access manager will attempt to download the Flash Lite Installer file from the URL where the player may be downloaded at operation 1132. Once the Flash Lite Installer file is downloaded, the Flash Lite Installer will be started at operation 1134. Once the Flash Lite Installer is done, the installation process is complete at operation 1136.

Figure 12:
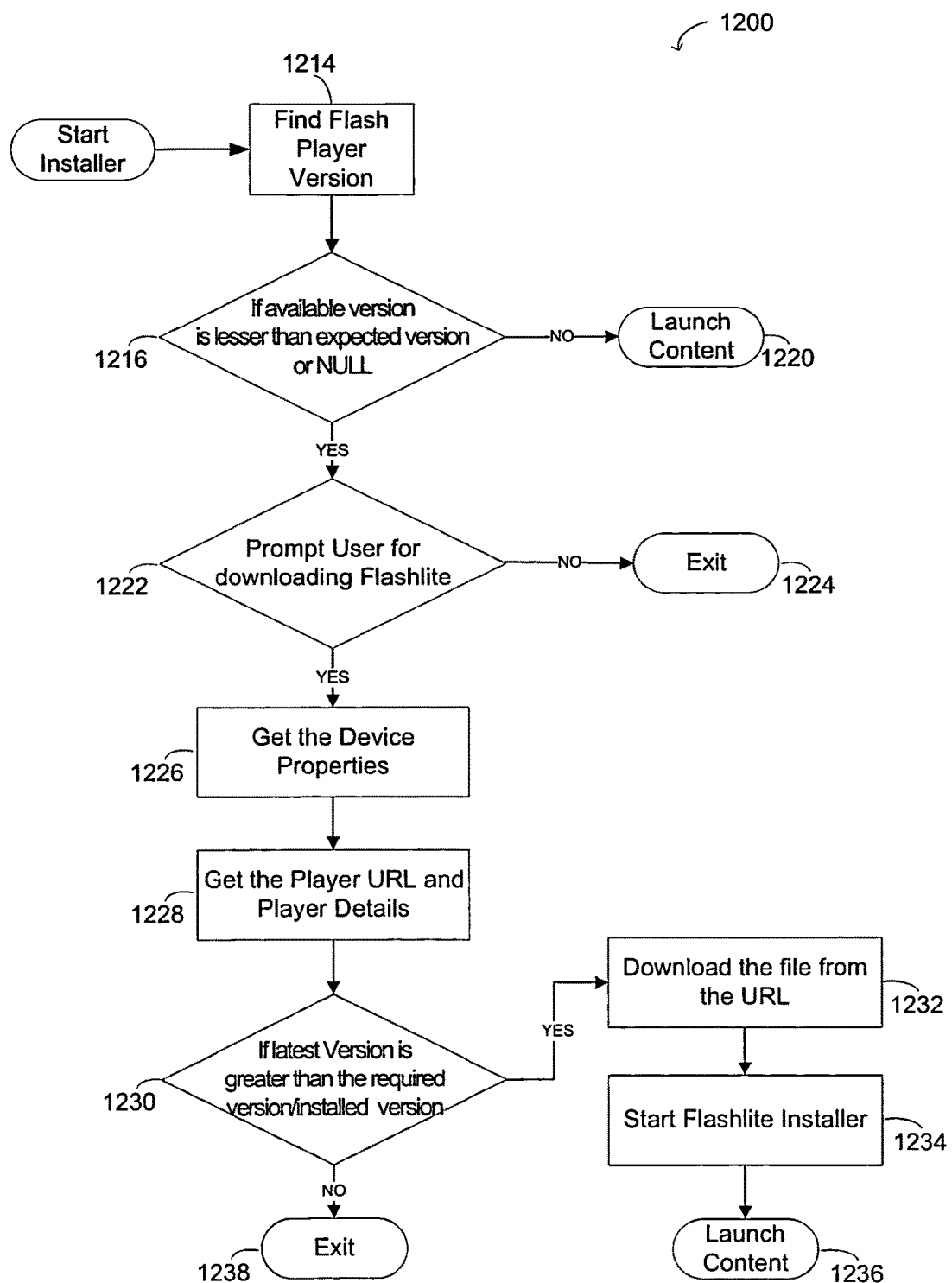
FIG. 12 is a flow diagram illustrating a method to provide process to and launch Flash content data by distributing Flash Lite Players according to various embodiments.

FIG. 12 is a flow diagram illustrating a method 1200 to provide access to, and play, Flash content data by distributing Flash Lite Players according to various embodiments, though it should be understood that this is provided only for illustration purposes and this could apply to other content and media players other than the Flash context. The method 1200 may begin when the content access manager has been launched on a user device. The method 1200 may start by determining the Flash Player version of the Flash Player installed on the user machine at operation 1214. At operation 1216, it can be determined if the version available on the user machine is less than a version required to play the content or if the version is a NULL value because of an error or because there is no Flash Player installed on the user machine. If the installed Flash Player version is not NULL and not less than expected, the content can be accessed with the existing Flash Player on the user machine and the content can be launched at operation 1220.

If the installed player version is NULL or less than expected/desired, a query may be made to download a compatible version of the Flash Lite Player at operation 1222. If the user does not want to download a compatible version of the Flash Lite Player, the content access manager may exit at operation 1224. If the user wants to download a compatible version of the Flash Lite Player, the content access manager will gather the device properties of the user machine at operation 1226. Next, at operation 1228, the content access manager will get the location and player details of the Flash Lite Player to be downloaded. As noted above, this may be done by sending the device properties and content compatibility information to a player server. The player server may then operate to determine an appropriate Flash Lite Player and send the content access manager the player details and URL where the player may be downloaded.

At operation 1230, the content access manager checks to determine that the version of the player to be downloaded is greater than or equal to the version required to access the content or greater than the version of the player installed on the user machine. If it is not, the player to be downloaded will be unable to access the content and the content access manager will exit at operation 1238.

At operation 1230, if the version of the player to be downloaded is greater than the version required to access the content or greater than the version of the player installed on the user machine, the content access manager will attempt to download the Flash Lite Installer file from the URL where the player may be downloaded at operation 1232. Once the Flash Lite Installer file is downloaded, the Flash Lite Installer will be started at operation 1234. Once the Flash Lite Installer is done, the installation process is complete at operation 1236.

Figure 13:
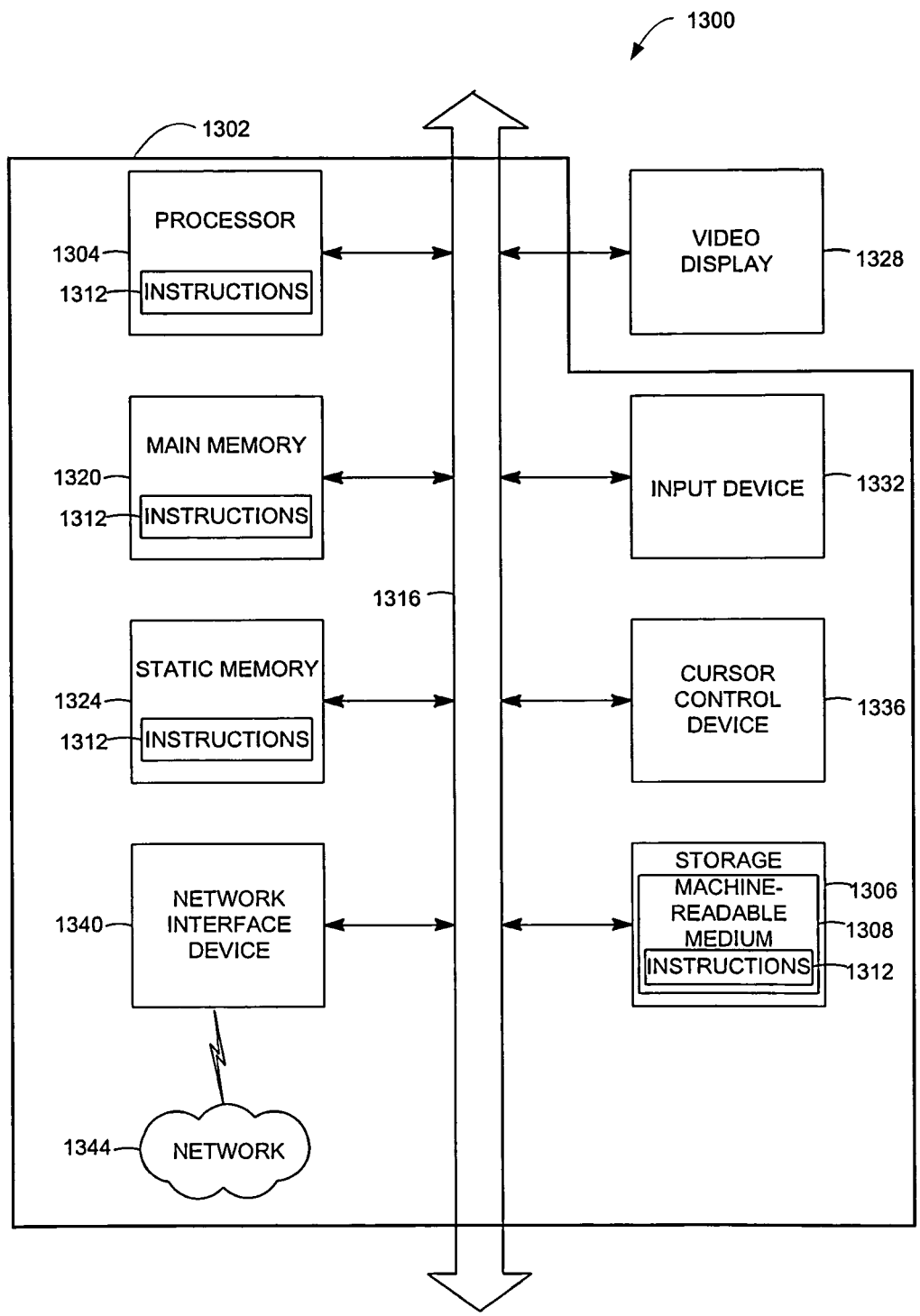
FIG. 13 is a block diagram of an article of manufacture, including a machine, according to various embodiments.

FIG. 13 is a block diagram of an article 1300 of manufacture, including a machine 1302, according to various embodiments. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment.

Thus, other embodiments may be realized. For example, an article 1300 of manufacture, such as a computer, a memory system, a magnetic or optical disk, some other storage device, and/or any type of electronic device or system may include one or more processors 1304 coupled to a machine-readable medium 1308 such as a memory (e.g., removable storage media, as well as any memory including an electrical, optical, or electromagnetic conductor) having instructions 1312 stored thereon (e.g., computer program instructions), which when executed by the one or more processors 1304 result in the machine 1302 performing any of the actions described with respect to the methods described above.

The machine 1302 may take the form of a computer system having a processor 1304 coupled to a number of components directly, and/or using a bus 1316. The components of the machine 1302 may include main memory 1320, static or non-volatile memory 1324, and mass storage device 1306. Other components coupled to the processor 1304 may include an output device, such as a video display 1328, an input device 1332, such as a keyboard, and a cursor control device 1336, such as a mouse. A network interface device 1340 to couple the processor 1304 and other components to a network 1344 may also be coupled to the bus 1316. The instructions 1312 may further be transmitted or received over the network 1344 via the network interface device 1340 utilizing any one of a number of well-known transfer protocols (e.g., the HyperText Transfer Protocol). Any of these elements coupled to the bus 1316 may be absent, present singly, or present in plural numbers, depending on the specific embodiment to be realized.

The processor 1304, the memories 1320, 1324, and the storage device 1306 may each include instructions 1312 which, when executed, cause the machine 1302 to perform any one or more of the methods described herein. For example, some embodiments may comprise a machine-readable medium having instructions stored therein for causing a machine to implement a method that comprises any of the activities described above.

In some embodiments, the machine 1302 operates as a standalone device or may be connected (e.g., networked) to other machines. In a networked environment, the machine 1302 may operate in the capacity of a server or a client machine in server-client network environment, or as a peer machine in a peer-to-peer (or distributed) network environment. The machine 1302 may comprise a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while only a single machine 1302 is illustrated, the term "machine" shall also be taken to include any collection of machines that individually or jointly execute a set (or multiple sets) of instructions to perform any one or more of the methodologies discussed herein.

While the machine-readable medium 1308 is shown as a single medium, the term "machine-readable medium" should be taken to include a single medium or multiple media (e.g., a centralized or distributed database, and/or associated caches and servers, and or a variety of storage media, such as the processor 1304 registers, memories 1320, 1324, and the storage device 1306) that store the one or more sets of instructions 1312. The term "machine-readable medium" shall also be taken to include any medium that is capable of storing, encoding or carrying a set of instructions for execution by the machine and that cause the machine 1302 to perform any one or more of the methodologies of the embodiments presented herein, or that is capable of storing, encoding or carrying data structures utilized by, or associated with, such a set of instructions. The terms "machine-readable medium" or "computer-readable medium" shall accordingly be taken to include tangible media, such as solid-state memories and optical and magnetic media.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or a computational object to achieve a particular function, operation, processing, or procedure.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those of ordinary skill in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Some portions of the detailed description above are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification, discussions utilizing terms such as "processing," "computing," "calculating," "determining," or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving a file package, the file package comprising content data, a content access manager, and metadata, the content data including content for presentation to a user, the metadata comprising information specifying one or more compatible players capable of processing the content data for presentation of the content to the user; and
   launching the content access manager to enable processing of the content data via a machine, the content access manager to:
      read the compatible player information from the metadata,
      determine whether a compatible player capable of processing the content data is currently installed on the machine based on the compatible player information specified by the metadata and a look up of player types currently installed on the machine, and
      install the compatible player specified by the metadata on the machine when the compatible player is not currently installed on the machine.

2. The method of claim 1, wherein the content access manager comprises: a generic content access manager configured to determine player compatibility corresponding to a plurality of content data types.

3. The method of claim 1, wherein the file package is a transmittable unit comprising an installable file, a ZIP file, or a self-extracting program.

4. The method of claim 1, further comprising:
   determining a player type of the compatible player; and
   determining a player version of the compatible player.

5. The method of claim 1, further comprising:
   determining whether an installed player is a latest available version.

6. The method of claim 1, further comprising:
   determining that the compatible player is currently installed on the machine and that the compatible player is not the latest available version; and
   based on the determining, installing the latest available version of the compatible player available.

7. The method of claim 1, further comprising:
   transmitting information about the content data to a remote location accessible via a network;
   transmitting device information to the remote location; and
   retrieving the compatible player from a remote location accessible via a network.

8. The method of claim 1, further comprising: launching the compatible player to process the content data.

9. A method comprising:
   receiving content data, the content data including content for presentation to a user;
   receiving compatible player data, the compatible player data specifying one or more compatible players capable of processing the content data for presentation of the content to the user;
   generating metadata using the compatible player data; and
   transmitting to a receiver a file package comprising the content data, metadata, and a content access manager, the content access manager being configured to:
   read the compatible player data from the metadata,
   determine whether a compatible player capable of processing the content data is currently installed on a machine based on the one or more compatible players specified by the metadata and a look up of player types currently installed on the machine, and
   install the compatible player specified by the metadata on the machine when the compatible player is not currently installed on the machine.

10. The method of claim 9, wherein the compatible player data comprises:
    supported device information.

11. The method of claim 9, further comprising:
receiving data about the content data, and
generating metadata using the compatible player data and data about the content data.

12. The method of claim 9, wherein the content access manager comprises:
a generic content access manager configured to determine whether the compatible player is installed on the machine to process a plurality of content data types.

13. The method of claim 9, wherein the file package is a transmittable unit comprising an installable file, a ZIP file, or a self-extracting program.

14. A non-transitory machine-readable medium comprising stored instructions, wherein the instructions, when executed, cause a user device to:
read metadata comprising compatible player data that specifies a compatible player type;
determine whether a compatible player capable of processing content data is currently installed on the user device, the content data comprising content for presentation to a user, the compatible player determined based on:
sending the compatible player type specified by the metadata to a player distribution server,
sending user device information to the player distribution server, and
responsive to sending the compatible player type and user device information:
A) receiving a location of the compatible player from the player distribution server; and
B) installing, from the location received from the player distribution server, the compatible player on the machine when the compatible player is not currently installed on the machine.

15. The machine-readable medium of claim 14, further comprising:
the content data and the metadata.

16. A system comprising:
a storage medium to store metadata and content data, the content data including content for presentation to a user; and
a content access manager module configured to
read, at a machine, the metadata comprising information specifying one or more compatible players capable of processing content data for presentation of the content to the user;
determine whether a compatible player capable of processing the content data is currently installed on the machine based on the compatible player information specified by the metadata and a look up of player types currently installed on the machine; and
install the compatible player specified by the metadata on the machine when the compatible player is not currently installed on the machine.

17. The system of claim 16, further comprising:
an input/output (I/O) interface to receive a package comprising the content data, the content access manager, and the metadata.

18. The system of claim 16, wherein the content access manager module comprises:
a generic content access manager module configured to determine whether the compatible player is installed on the machine to process a plurality of content data types.

19. The system of claim 16, wherein the metadata, content data, and a content access manager module are stored as a file package comprising an installable file, a ZIP file, or a self-extracting program.

20. The system of claim 16, wherein the machine comprises a mobile device.

21. The system of claim 16, further comprising an I/O interface wherein the I/O interface is to:
transmit information about the content data to a remote location accessible via a network; transmit device information to the remote location accessible via a network; and
receive the compatible player from a remote location.

22. A system comprising:
at least one processor coupled to a memory;
a packaging module configured to, using the at least one processor:
receive content data including content for presentation to a user and compatible player data specifying one or more compatible players capable of processing the content data for presentation of the content to the user,
generate metadata using the compatible player data specifying the one or more compatible players, and
create a file package comprising the content data, the metadata, and a content access manager, the content access manager configured to:
A) read the compatible player information from the metadata, B) determine whether a compatible player capable of processing the content data is currently installed on a machine based on the compatible player information specified by the metadata and a look up of player types currently installed on the machine, and
C) install the compatible player specified by the metadata on the machine when the compatible player is not currently installed on the machine; and
a distribution module configured to transmit, using the at least one processor, the file package to a receiver.

23. The system of claim 22, wherein the receiver is:
a user device.

24. The system of claim 22, wherein the receiver is:
an aggregator, wherein the aggregator is configured to collect a plurality of packages and distribute the plurality of packages to one or more user machines.

25. The system of claim 22, wherein the packaging module is configured to receive content data and compatible player data from a user interface.

26. The system of claim 22, wherein the content access manager comprises:
a generic content access manager configured to determine whether the compatible player is installed on a machine to process a plurality of content data types.

27. A method comprising:
executing instructions on a computing platform to receive binary digital electronic signals representing a file package, the file package comprising binary digital electronic signals representing content data, a content access manager, and binary digital electronic signals representing metadata, the content data including content for presentation to a user and the metadata comprising information specifying one or more compatible players capable of processing the content data for presentation of the content to the user;
executing instructions on the computing platform to store the binary digital electronic signals representing the file package in a memory location of the computing platform; and
executing instructions on the computing platform to initialize the content access manager to enable access to the binary digital electronic signals representing content data via a machine, the content access manager to:
read the binary digital electronic signals representing the metadata,
determine whether a compatible player capable of accessing the binary digital electronic signals representing content data is currently installed on the machine based on the binary digital electronic signals representing the compatible player information of the metadata and a look up of player types currently installed on the machine, and
install the compatible player specified by the metadata on the machine when the compatible player is not currently installed on the machine.

28. A method comprising:
executing instructions on a computing platform to receive binary digital electronic signals representing content data including content for presentation to a user;
executing instructions on the computing platform to receive binary digital electronic signals representing compatible player data, the compatible player data including information about at least one compatible player specifying a version of a compatible player capable of accessing the binary digital electronic signals representing content data;
executing instructions on the computing platform to generate metadata using the compatible player data; and
executing instructions on the computing platform to transmit to a user device a file package comprising the binary digital electronic signals representing content data, metadata, and a content access manager, the content access manager being configured to:
read the version of the compatible player specified by the metadata,
determine whether a compatible version of a player capable of processing the content data is currently installed on a machine based on the version of the compatible player specified by the metadata and a look up of player types currently installed on the machine, and
install the compatible version of the player specified by the metadata on the machine when the compatible version of the player is not currently installed on the machine.

29. The method of claim 1, wherein the file package comprises a SIS installable file or a CAB installable file.

30. The system of claim 16, wherein the content data comprises Flash content data or SWF content data.

31. The system of claim 30, wherein the compatible player specified by the metadata comprises an Adobe Flash® player or Adobe Flash Lite™ Player.

32. The system of claim 22, wherein the packaging module is further configured to provide a user interface to facilitate creation of the file package.

33. The system of claim 32, wherein the user interface is configured to publish the package file to aggregators.

34. The system of claim 32, wherein the user interface is configured to receive from a user information specifying one or more of: an application name specifying a name of the application content data; an application version specifying a version of the packaged application; an author specifying the name of the publisher of the content; a description specifying a description of the application; a root folder specifying a first folder where one or more of the application content files are located; and an output folder specifying a second folder where the package is to be created.

35. The system of claim 34, wherein the user interface is further configured to receive information specifying requirements of the content data and which devices or platforms the content data are intended to run on.

36. The system of claim 22, wherein creating a file package comprises:
obtaining, by the packaging module, targeted Windows® Platform information;
copying platform template files to a storage location;
associating an icon with the content data;
updating a setup file with the application name and other content information;
copying content files into the storage location;
creating, using a CAB utility, a CAB file; and
providing the CAB file as the file package.

37. The system of claim 36, wherein CAB utility is a CABARC CAB creation utility program.

38. The system of claim 22, wherein creating a file package comprises:
obtaining, by the packaging module, targeted Symbian™ Platform information;
copying platform template files to a storage location;
associating an icon with the content data;
copy the icon into a project directory;
updating template project files with a UID and content name;
compiling the project to generate an executable file;
copying content files into the storage location;
updating a set of files to be included in the package file with the content files;
calling a MakeSis function and a SignSis function to generate a self-signed SIS file; and
providing the SIS file as the file package.

* * * * *

UNITED STATES PATENT AND TRADEMARK OFFICE
CERTIFICATE OF CORRECTION

PATENT NO. : 10,025,573 B2
APPLICATION NO. : 12/420615
DATED : July 17, 2018
INVENTOR(S) : Umapathy et al.

It is certified that error appears in the above-identified patent and that said Letters Patent is hereby corrected as shown below:

On the Title Page

Item (75):
Column 1, Line 5 (Inventors): Please remove "Akshava G," and replace with --Akshaya G,--

In the Specification

Column 12, Line 26: Please remove "and or" and replace with --and/or--

Signed and Sealed this
Twelfth Day of May, 2020

Andrei Iancu
*Director of the United States Patent and Trademark Office*